Figure 1:
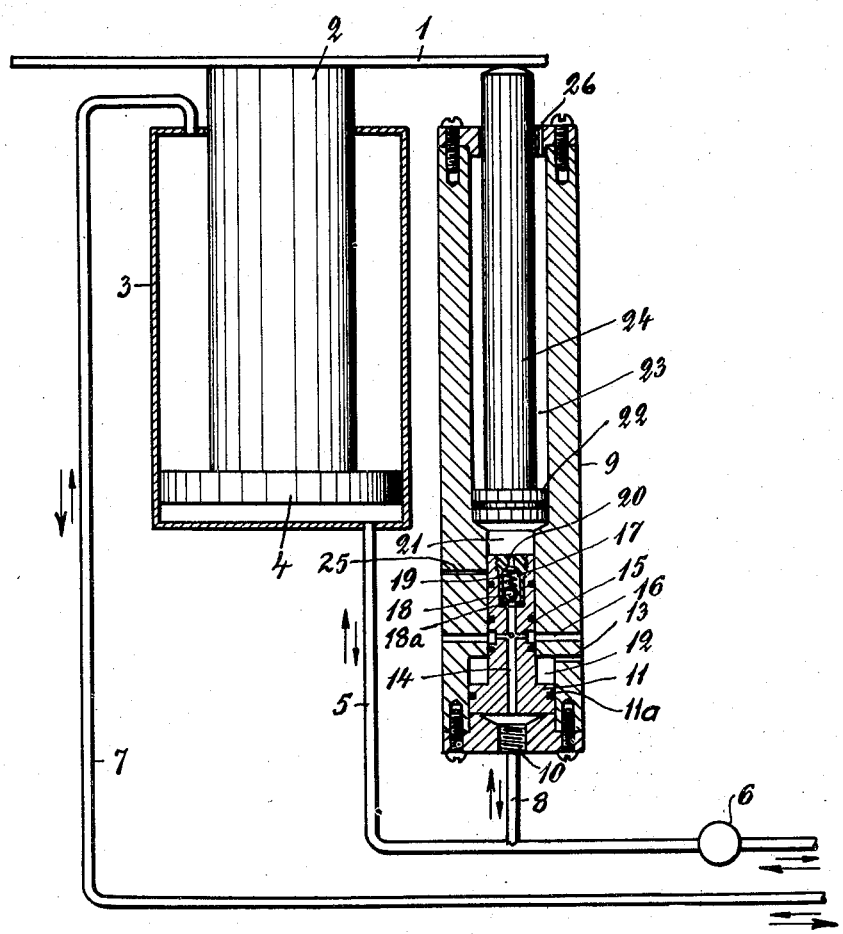

Sept. 2, 1958 K. B. VESOMA 2,849,766
SPEED CONTROLLING DEVICE FOR THE PATTERN
SEPARATING APPARATUS OF A MOLDING MACHINE
Filed Nov. 30, 1954 4 Sheets-Sheet 1

INVENTOR
Karl Birger Vesoma
By George H Corey
ATTORNEY

Sept. 2, 1958 K. B. VESOMA 2,849,766
SPEED CONTROLLING DEVICE FOR THE PATTERN
SEPARATING APPARATUS OF A MOLDING MACHINE
Filed Nov. 30, 1954 4 Sheets-Sheet 2

INVENTOR
Karl Birger Vesoma
By George Horey
ATTORNEY

Sept. 2, 1958　　　K. B. VESOMA　　　2,849,766
SPEED CONTROLLING DEVICE FOR THE PATTERN
SEPARATING APPARATUS OF A MOLDING MACHINE
Filed Nov. 30, 1954　　　　　　　　　　　　　4 Sheets-Sheet 4

INVENTOR
Karl Birger Vesoma
By George H. Carey
ATTORNEY

United States Patent Office 2,849,766
Patented Sept. 2, 1958

2,849,766

SPEED CONTROLLING DEVICE FOR THE PATTERN SEPARATING APPARATUS OF A MOLDING MACHINE

Karl Birger Vesoma, Stockholm, Sweden, assignor to Aktiebolaget Westin & Backlund, Stockholm, Sweden Application November 30, 1954, Serial No. 472,182

Claims priority, application Sweden December 2, 1953

10 Claims. (Cl. 22—26)

This invention relates to foundry equipment and more particularly to the pattern withdrawing or separating apparatus of a molding machine.

In molding machines for the production of molds the sand is first packed or rammed evenly round the pattern in a flask, or the pattern is pressed into the sand, after which the pattern is to be separated from the flask through a so-called pattern withdrawing or separating operation. It has been found to be desirable in this connection that a first portion of the pattern withdrawing movement, at least, should not be executed at too high a speed since in this case the mold is liable to get damaged. On the other hand, however, it is desirable that the total operating time for carrying out the pattern withdrawal should not be excessive which would tend to reduce the capacity of the molding machine too much.

The present invention has for its object in a more efficient manner than hithertofore to fulfill both these requirements in molding machines of the type in which the pattern withdrawing operation is carried out by means of an operating piston reciprocable in a cylinder and actuated by a compressed fluid, such as air or liquid, and in which a controlling device actuated by said fluid under pressure is arranged in response to the pressure conditions existing in the operating cylinder to control the pattern withdrawing movement performed by said operating piston in such a manner as to cause this movement to occur at a substantially lower speed in a first stage of the pattern withdrawing operation than in the remaining stage of the withdrawal.

For the object stated, according to the present invention, the speed controlling device referred to in the preceding paragraph comprises a valve member such as a valve plunger or the like which is adapted in a predetermined position to open an outlet for the pressure fluid within the operating cylinder, said valve member being subjected, on one hand, to the pressure prevailing within said cylinder and, on the other hand, to the oppositely acting pressure within a compression chamber in which the pressure is dependent on the downward movement of the operating piston.

Figure 2:
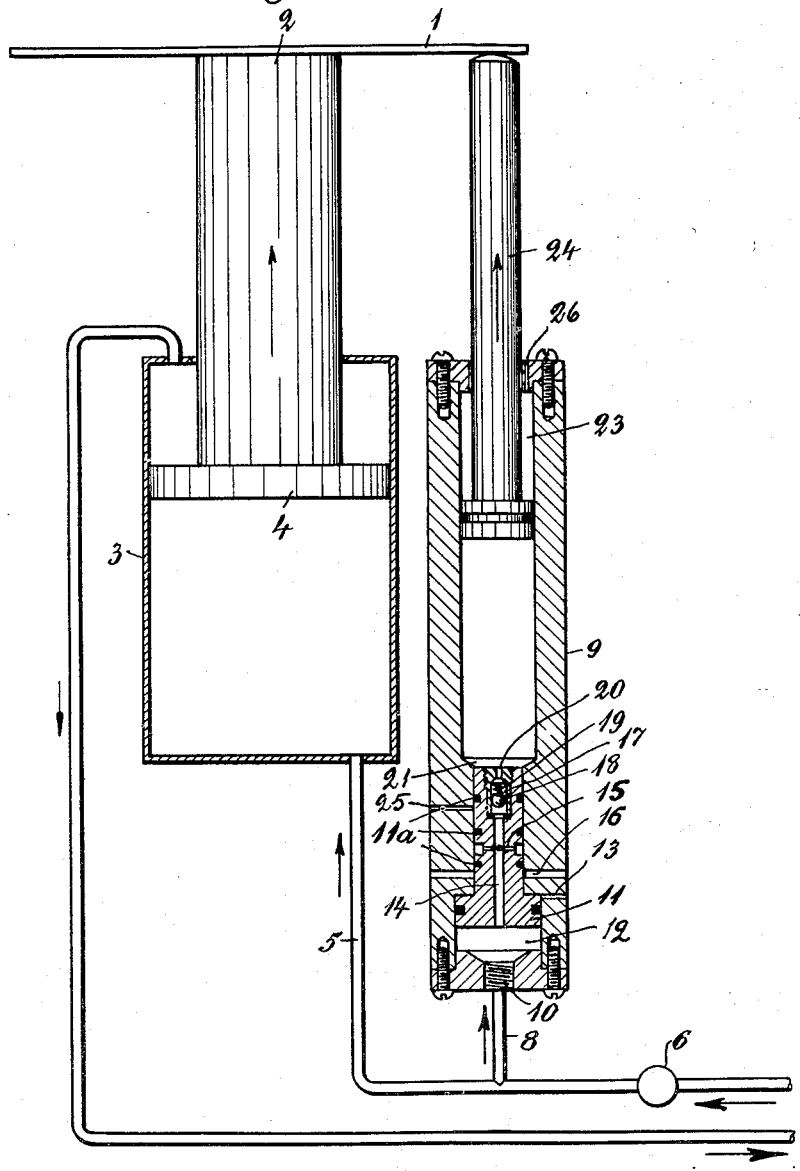
Figure 3:
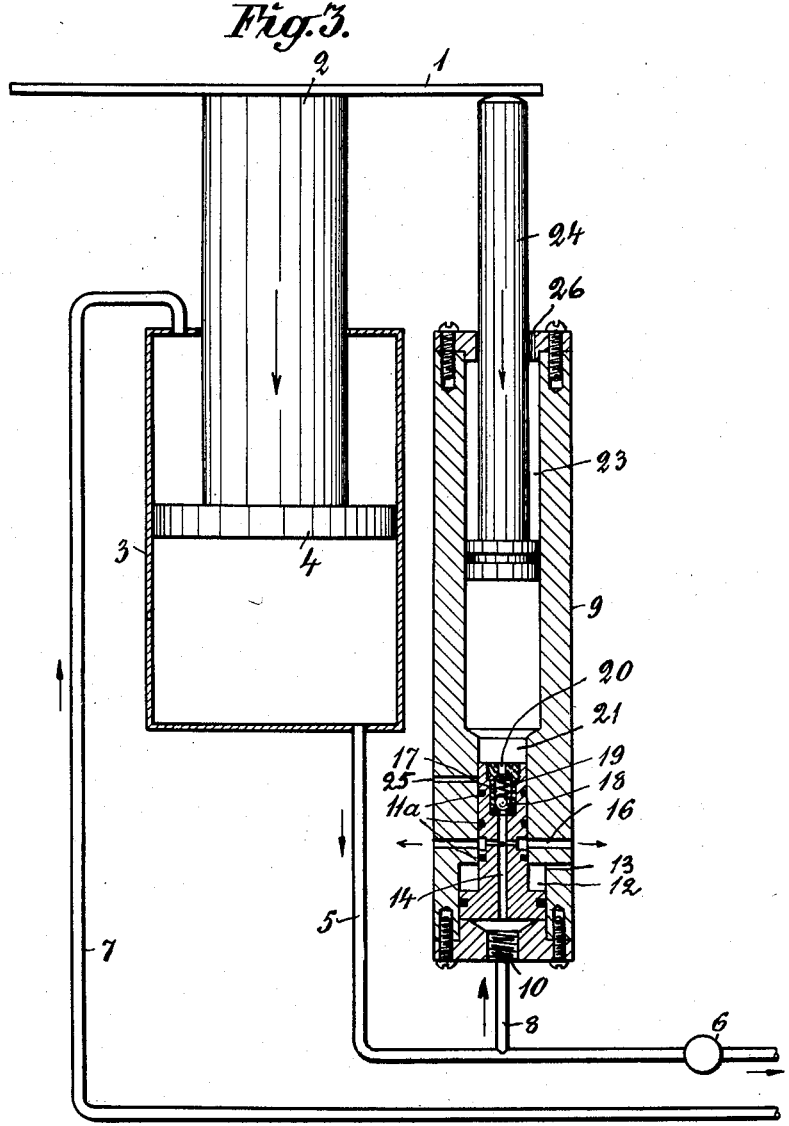

A preferred embodiment of the invention is illustrated diagrammatically by way of example in the accompanying drawings in which:

Fig. 1 illustrates in sectional elevation the ramming and pattern withdrawing apparatus together with the speed controlling device in their inoperative or resting position, Fig. 2 illustrates the same parts in their ramming position, and Fig. 3 illustrates the same parts in the latter stage of the pattern withdrawing operation.

Figure 4:
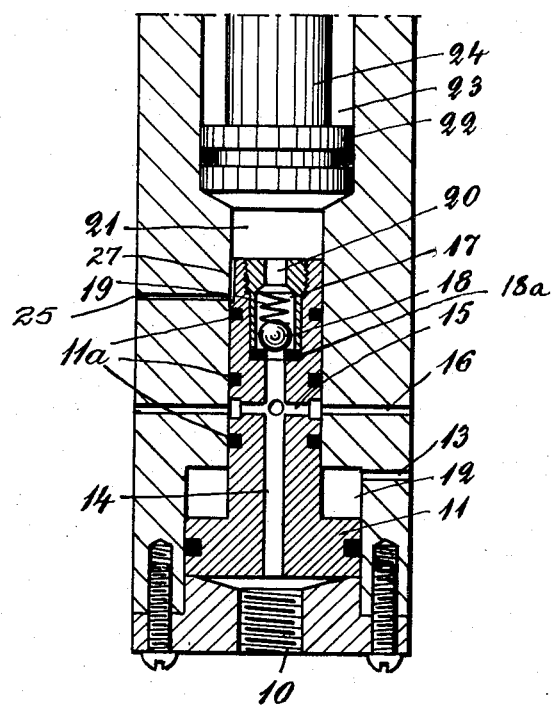

Fig. 4 to a larger scale, illustrates part of the speed controlling device.

Referring now to the drawings more specifically, numeral 1 designates a pattern plate on which the sand-filled flask containing the pattern (not shown) is placed. The pattern plate is carried by a piston rod 2 connected to an operating piston 4 reciprocable within an operating cylinder 3. Connected to the cylinder 3 is a pipe 5 through which fluid under pressure is admitted below the operating piston 4 during the ramming operation (Fig. 2), and also a pipe 7 serving as an evacuating pipe during the ramming operation. The pipe 5 has inserted therein a speed governor 6 known per se which offers a free through-flow path for the fluid under pressure in one direction of flow (in this case towards the operating cylinder 3) and a controllable through-flow path therethrough in the opposite direction (for controlling the initial speed in the pattern withdrawing operation).

A branched-off pipe 8 from the pipe 5 is connected to the automatic speed controlling device provided in accordance with the present invention. This device comprises a casing or body 9 having an inlet 10 connecting the pipe 8 with a valve chamber 12 within which a valve piston or plunger 11 provided with sealing rings 11a is displaceable. Above the lower portion of the piston 11 the chamber 12 has a vent hole 13. The piston 11 has a central through-flow bore 14 extending therethrough which communicates with cross-passages 15 in the body of the piston. In a predetermined position of the piston 11 (Figs. 1 and 3) these passages 15 will be in registering alignment with corresponding exhaust passages 16 in the wall of the body or casing 9 so as to enable compressed fluid to be exhausted from the portion of the chamber 12 below the piston 11. The piston 11 is provided in its upper portion with a bore 17 receiving a non-return valve ball 18 actuated by a spring 19 and adapted in response to a sufficient pressure acting from below to be lifted from its annular seating 18a so as to pass air under pressure from the chamber 12 to through-flow passage 20 and thence into the lower portion, or compression chamber, 21 of a cylinder 23 formed in the body 9 for a compression piston 22. The latter has connected thereto a piston rod 24 which projects from the cylinder 23 and cooperates at its extreme end with the pattern plate 1 or with any other part associated with the operating piston 4. The cylinder 23 is provided with a vent hole 26 at its upper end. An exhaust passage 25 is provided at a predetermined level in the cylinder wall surrounding the valve piston or plunger 11.

During the ramming operation (Fig. 2) the pattern plate is moved upwards in that air under pressure is admitted below the operating piston 4 from the pipe 5, and at the same time air is discharged from the upper portion of the cylinder 3 through the pipe 7. The ramming of the sand, or the squeezing of the pattern into the sand, respectively, is effected against a fixed reaction member (not shown) situated above the pattern plate. In the course of this ramming operation a portion of the air under pressure from the pipe 5 will also be admitted into the chamber 12 of the speed controlling device 9. Since the ball valve 18 is initially closed and the passages 14, 15 and 16 are greatly restricted relative to the undersurface of plunger 11 the plunger is first moved upwardly to the position shown in Fig. 2 which closes the exit portion 16 shortly after the upward movement begins. Thereafter, the pressure against the ball valve is increased and it opens allowing the compressed air to pass into the compression chamber 21 where by the piston 22 will be moved upwardly causing the piston rod 24 to follow up the movement of the pattern plate. Thus, in this operation the speed controlling device 9 will not affect the movement of the rammer 4.

When pattern withdrawing or separation is to take place a valve (not shown) is changed over causing the compressed air instead to be supplied through the pipe 7 into the upper portion of the cylinder 3, whilst the pipe 5 will serve as an outlet connection from the lower portion of the cylinder below the operating piston 4 (Fig.

3). As a result, the pattern plate 9 starts to move downwards in order to separate the pattern from the flask. In this operation the pattern is retained in its position against said fixed reaction member. In the course of its downward stroke the pattern plate 1 actuates the piston rod 24 so as to urge the piston 22 downwardly. The passage 14 through the non-return valve 18 is closed so that during the first portion of this stroke the air present within the cylinder chamber 21 will be compressed. During this first portion of the downward stroke the air below the operating piston 4 cannot be exhausted through the valve 11 but has to be evacuated through the speed governor 6 which initially is set so as to materially throttle the through-flow of air whereby the downward movement of the pattern plate 1 will be retarded initially. Due to the action of the pressure in the chamber 21 the valve piston 11, after a predetermined interval of time, will be moved downwards into the position illustrated in Figs. 3 and 4, so as to cause the calibrated passage 25 (shown in Fig. 4 only) to be situated above the uppermost sealing ring 11a of the valve piston 11. Above this sealing ring a slight clearance space 27 exists between the valve plunger 11 and the surrounding cylinder bore enabling the pressure air in the compression chamber 21 to escape at a slow rate through this space and the passage 25. At the same time the passages 15 and 16 will be aligned and constitute an exit for the pressure air present in the pipe 5 so that from this point the operating piston 4 and the pattern plate 1 are allowed to descend at a faster speed.

The interval of time elapsing before the valve piston 11 commences to descend from its upper position of Fig. 2 to its lower position of Fig. 3, i. e. the time period for the slow movement of the pattern plate, is determined by suitably dimensioning the upper and lower areas of the valve piston 11 relative to each other. It will be seen that the downward motion of this valve piston will be counteracted by the pressure prevailing in the pipe 5 acting upwardly on the lower and greater area thereof situated within the chamber 12, so that the pressure acting on its upper and smaller area within the compression chamber 21 will have to overcome the first-mentioned upward pressure before the valve piston 11 begins to move downwards towards its position according to Fig. 3.

It is understood that the various details of the arrangement described are susceptible of numerous modifications within the scope of the invention.

What I claim and desire to secure by Letters Patent is:

1. In a molding machine including pattern supporting means and primary operating piston means reciprocally responsive to the pressure of a fluid system acting on opposite surfaces of said primary piston means for advancing and withdrawing said pattern, a speed control device for decreasing the speed of movement of said pattern supporting means during part of said withdrawing movement, comprising at least secondary and tertiary piston members reciprocal in a common space so as to confine a compression chamber therebetween, said secondary piston member having one surface subjected to the pressure of said fluid system and the opposite surface subjected to the pressure in said compression chamber so as to be moved from a resting position to an active position responsive to the relative value of said two pressures, said tertiary piston member engaging said pattern supporting means so as to be moved toward said secondary piston member to increase the pressure in said compression chamber during said withdrawing movement to a value sufficient to move said secondary piston member to said resting position, said secondary piston member having at least one passage connecting said fluid system with outlet passages in said resting position.

2. A speed control device according to claim 1 wherein the pressure of the fluid system acting on the said one surface of said secondary piston member is substantially the same as the fluid pressure acting on one of the two opposite surfaces of said primary operating piston means, said pressure on said one surface relative to said opposed surface of said primary piston means being higher during said advancing movement and lower during said withdrawing movement.

3. A speed control device according to claim 1 including at least one passage connecting the two surfaces of said secondary piston member and valve means closing said compression chamber from said fluid system above a predetermined relation of the pressure in said compression chamber and in said fluid system.

4. A speed control device according to claim 1 wherein said secondary piston member comprises at least one passage connecting its two opposite surfaces, and valve means for closing said passage that opens at a pressure above a predetermined ratio between the pressure in the fluid system and in the compression chamber.

5. A speed control device according to claim 1 wherein said one surface of said secondary piston member subjected to the pressure of the fluid system is greater in area than said opposite surface subjected to the pressure in said compression chamber.

6. A speed control device according to claim 1 including an outlet passage connected to said compression chamber, said outlet passage being open in said resting position and closed in said active position.

7. A speed control device according to claim 1 wherein said primary operating piston means and said tertiary piston member have substantially equal stroke.

8. A speed control device according to claim 1 including valve means connecting said fluid system with said compression chamber at a pressure exceeding a predetermined value of the pressure of said fluid system relative to the pressure in said compression chamber whereby said tertiary piston member will be displaced when said predetermined value is exceeded.

9. A speed control device according to claim 1 including means for engaging said tertiary piston member by said pattern supporting means at least during said withdrawing movement so as to displace said tertiary piston member in conjunction with said withdrawing movement.

10. A speed control device according to claim 1 wherein said secondary piston member is provided with a second passage extending from said one surface subjected to the pressure of said fluid system through a valve means to said opposite surface subjected to the pressure in said compression chamber, said one passage being connected with said second passage and also extending from said one surface to openings on said secondary piston member, said openings registering in said resting position with outlet openings and being closed in said active position.

References Cited in the file of this patent

UNITED STATES PATENTS

| | | |
|---|---|---|
| 1,471,033 | Johnson | Oct. 16, 1923 |
| 1,666,578 | McCabe | Apr. 17, 1928 |
| 2,206,459 | Hagemeyer | July 2, 1940 |